Oct. 10, 1961 G. BOSMAJIAN 3,004,081
CYCLOOLEFIN PRODUCTION
Filed May 29, 1959 2 Sheets-Sheet 2

FIG. 5

INVENTOR
GEORGE BOSMAJIAN

BY Beale and Jones

ATTORNEYS

3,004,081
CYCLOOLEFIN PRODUCTION
George Bosmajian, Birmingham, Ala., assignor, by mesne assignments, to Cities Service Research and Development Company, New York, N.Y., a corporation of New Jersey
Filed May 29, 1959, Ser. No. 816,856
12 Claims. (Cl. 260—666)

This invention relates to the production of cycloolefins, particularly 1,5-cyclooctadiene, substituted 1,5-cyclooctadienes, 1,5,9-cyclododecatriene, and substituted 1,5,9-cyclododecatrienes.

A number of prior processes are available for the production of cycloolefins from conjugated open chain diolefinic compounds using thermal and catalytic methods. One process comprises the thermal dimerization of 1,3-butadiene to 1,5-cyclooctadiene continuously at temperatures between about 315° and 590° C. under a pressure of 20 to 250 p.s.i.a., with or without a solid contact material such as glass, alumnia, or silica, and with a treatment time of between 1 and 50 seconds. The solid contact material if used possibly has catalytic activity, although mere thermal dimerization is suggested. In this prior continuous process it has been found that below the minimum temperature of about 315° C. excessive amounts of 4-vinylcyclohexene are obtained. An example of such a continuous process is found in United States Patent 2,631,173 to Hillyer and Smith.

Another prior art process involves the production of cycloolefins from conjugated open chain diolefinic compounds using a catalyst derived from nickel carbonyl by the replacement of one or two of the CO groups thereof with an organic phosphite or phosphine in the presence of a solvent, and preferably in the presence of calcium carbide as a dehydrating agent and acetylene to facilitate the reaction. A solvent-catalyst-acetylene system is exemplified by United States Patents 2,686,208, and 2,686,209, as well as in the Journal of the Chemical Society (London), 1954, pp. 1931–1941, by Hugh W. B. Read. The solvent-catalyst system of Reed involved temperatures of between about 80° and 150° C., and preferably between 100° and 130° C. in view of the fact that it was found that above 130° C. extensive conversion of a diolefin such as butadient to byproducts such as 4-vinyl-cyclohexene occurs.

Certain catalyst activators and other catalysts are useful in the reaction under certain conditions.

Problems encountered with the continuous thermal dimerization proces noted above, with or without a solid contact material, include a low quantity of conversion of open chain conjugated diolefin to cycloolefins or other products, a low yield and a low selectivity for cycloolefins based on conversion. In solvent-catalyst systems, the fact that dimerization reactions of the type disclosed herein are extremely erratic is well known, and is believed to be due to "poisons" for the reaction or for catalysts used therein. Thus, in complex polymerization systems using catalysts, various materials are present, including solvent, dehydrating agents, pressurizing gases, and catalyst activators, and the opportiunity for trace amounts of reaction poinsons to enter the system is greatly enhanced. Although the theory as to poisons may explain erratic results, other unknown factors may of course be involved.

According to the present invention advantages of the above-described thermal process are combined with advantages of the above-described catalytic process.

It is an object of this invention to prepare cycloolefinic compounds by contacting a reaction medium, consisting essentially of a conjugated open chain diolefin monomer with catalyst.

A similar object is to utilize a reaction medium consisting of such monomers.

An additional object of the invention is similar to those preceding, and includes the use of added solvents at certain temperatures, and the use of temperatures heretofore not known to be operable.

It is another object of this invention to accomplish the preceding objects by batch, semi-continuous, and continuous methods.

Other objects of the invention are to prepare cyclooctadiene and cyclododecatriene in accordance with the preceding objects of the invention.

Other objects of the invention will be apparent to those skilled in the art from a consideration of the description which follows:

The starting material for this invention is a conjugated open chain diolefin, preferably one which is in a gaseous or vapor state at room temperature and atmospheric pressure, and preferably 1,3-butadiene. Other conjugated open chain diolefins, particularly 1,3-diolefiins include 2-methyl-1,3-butadiene (isoprene); 1,3-pentadient (piperylene); phenyldiolefines; 2-chloro-1,3-butadiene (chloroprene); 2,3-dichloro-1,3-butadiene; and 2,3-dimethyl-1,3-butadiene. The halogen-substituted conjugated open chain diolefins preferably have no more than two halogen atoms substituted for hydrogen in each diolefin molecule. Mixed halogen derivatives such as chloro-fluoro-1,3-butadienes may be used. Other compounds which form cycloolefins having at least eight carbon atoms in the ring may also be used, an example being 2,4-hexadiene. If desired, peroxides may be removed from the diolefin feed by treatment with ferrous salts, thiosulfates, or sulfites according to available methods.

The catalysts or initiators utilizable herein include those found useful in prior processes, for example, nickel carbonyl bearing in lieu of one or two of its carbonyl groups a compound of a trivalent element of the periodic chart group VA, the nitrogen subgroup, having an atomic weight less than 31, that is, phosphorous or nitrogen. The catalysts of the nicket carbonyl variants in Reed United States Patents 2,686,208 and 2,686,209, particularly the nickel carbonyl phosphines and phosphites, are applicable. The preferred catalysts for use in this process have a formula $[(RO)_3P]_xNi(CO)_{4-x}$ or $[(R)_3P]_xNi(CO)_{4-x}$ where R is an alkyl, aryl, heterocyclic or other organic radical and $x$ has a value of one, or two and mixtures thereof, in which case $x$ would be between one and two. Reed discloses similar phosphites and phosphines in which $x$ is one or two. More particularly, it is preferred to use a catalyst having a structure $[(RO)_3P]_2Ni(CO)_2$ where R is phenyl or methyl.

It is to be noted that the nickel in these compounds or complexes exists in the zero-valent state.

The concentration of catalyst such as the above has been conveniently utilized at about 1% to 1.5% of the weight of the diolefin charged. However, higher or lower catalyst concentrations are practical; as low as 0.5% catalyst gives good yields, and about 3% has been used with excellent results. A satisfactory range is 0.1–10% by weight.

It is sometimes desirable but not essential to use a polymerization inhibitor to prevent the open-chain diolefins from polymerizing into products in addition to cycloolefins. Such inhibitors are recognized in the art and encompass mono- or polynuclear mono- or polyphenols, including phenol, catechol, p-tertiary-butylcatechol, resorcinol, 2,4-dimethyl-6-tertiary butylphenol, tertiary amylphenols, hydroquinones, hydroquinone, 2,5-ditertiary butyl-1,4-benzoquinone, other quinones, phloroglucinol, pyrogallol, and naphthols; also amines, including N,N'-diisopropyl-p-phenylenediamine, aniline, p-N diethylaminoaniline, naphthylamines, triethylamine, and phenothiazine; also aromatic polynitro compounds, picric acid, and terpenes. If present or added, an amount of polymerization inhibitor of from 0.01 to 4% by weight of diolefin starting material ordinarily gives satisfactory control of unwanted by-products. Amounts in the neighborhood of 5% or more may be detrimental to the reaction.

Widely varying pressures may be used. Pressures from 200 p.s.i.g. up to 1000 p.s.i.g. and higher have been used successfully. Optimum pressure is believed to be 400–600 p.s.i.g.

Improved results over the prior art processes of using the catalysts specified herein are obtained by deviating from the reaction conditions established in said prior art. The prior art temperature range is 80° C. to 150° C., and other conditions according to the prior art include conducting the reaction in the presence of a relatively large amount of solvent. It has now been found that by conducting the reaction at temperatures above 150° C., and up to about 205° C., more particularly between temperatures of somewhat above about 150° C., and below about 170° C., improved results are obtained. It has also now been discovered that if solvent is omitted, and the reaction is conducted at temperatures of between about 150° C. and 205° C., a still more marked improvement over the prior art is achieved. In the absence of solvent improved results are attained at temperatures of about 145° C. and even as low as 140° C. These improved results are shown in the examples given below, with comparisons of prior art conditions. If a solvent is present, at temperatures above 150° C. according to the invention, temperatures of 160° C. to 205° C. are preferred. The preferred range of temperature is between 150° and 170° C. Outside the preferred range certain undesirable results may occur. At temperatures below approximately 150° C. increasingly longer reaction times are required as the temperature decreases. The critical temperature of butadiene is 152° C., and accordingly the physical state of fluid reactants for reactions conducted at appropriate pressures below this temperature may be referred to as "liquid phase," whereas that for reactions conducted above the critical temperature may be referred to as "vapor phase." This theoretical distinction between "liquid" and "vapor" phase reactions is used for convenience in this discussion and is simply a means of describing temperature as related to the approximate critical temperature of the open chain diolefin itself. Thus, under usual reaction conditions as disclosed herein the catalyst is not volatile, nor is the cycloolefinic product. Accordingly, during at least a part of the reaction time, if soluble, the catalyst or initiator may be dissolved in liquid raw materials, or in liquid reaction products, or the catalyst may possibly crystallize at times when insufficient liquid, to serve as solvent, is present. It is to be understood that these and other hypotheses or theories presented herein are not intended to limit the invention, but are offered as possible explanations of principles, results, phenomena, and mechanisms of the reactions.

An important aspect of this invention is the discovery that the process as defined herein may be conducted continuously. Suitable conventional apparatus may be used, comprising for example reaction tubes of small diameter surrounded by means defining an enclosed space for a heat exchange medium, the tubes being adapted for pressures of at least 1000 p.s.i.g., means for feeding reactants under pressure such as a pump or a reservoir pressurized with gas, and valve or outlet means for withdrawing reaction products and maintaining the reactants under the desired pressure. Thus, one suitable apparatus comprises a reservoir for catalyst and liquid diolefin, means to maintain the reservoir temperature at a point low enough to maintain the diolefin in a liquid state, a source of pressurizing gas connected to the reservoir, a body of heat exchange liquid surrounding a stainless steel reaction tube, an outlet valve for maintaining the system under pressure, and suitable condensing means for recovering the products of reaction. Suitable means for measuring and controlling variables such as temperature, pressure, and feed rate may also be used. Advantageously, the condensing means for recovering unreacted initial materials such as butadiene or other diolefins are "Dry Ice" traps.

A particularly important aspect of this invention is that diolefins such as butadiene may be selectively reacted to form cycloolefins such as cyclooctadiene in preference to other products such as polymerization products and vinylcyclohexene, in the absence of any added material other than catalyst, at any temperature useful in this invention. Thus, extraneous solvent for the diolefin, reaction products, and/or catalyst, in the event a soluble catalyst is utilized, may be omitted. Catalyst "activator" such as isobutylene, diisobutylene, bicycloheptadiene, methylcyclopentadiene, methylcyclopentadiene dimer, dicyclopentadiene, cyclopentadiene, or cyclooctadiene may be omitted. Acetylene may be omitted. Polymerization inhibitors such as p-tertiary-butylcatechol may be omitted, and dehydrating agents such as calcium carbide may be omitted. In other words, the reaction mixture may consist, or consist essentially of the diolefin and catalyst. Stated another way, the process may comprise contacting the catalyst with a reactant composition consisting essentially of an open chain conjugated diolefin. The absence of certain materials such as extraneous solvents is critical at certain temperatures.

The language "consisting essentially of diolefin and catalyst" is intended to exclude major and conventional amounts of ingredients such as solvents (other than the straight chain conjugated diolefin itself), but not to exclude other conventional materials normally used in small amounts such as polymerization inhibitors, dehydrating agents such as calcium carbide, and/or catalyst activators. The language "in the absence of solvent" is intended to exclude extraneous solvents introduced into the reaction zone for the purpose of dissolving materials in the reaction mixture including the conjugated open chain diolefin and products of reaction.

Although the description in giving a specific embodiment relates primarily to dimerization, the invention may include the formation of cycloolefins derived from more than two molecules of diolefin. For instance, where butadiene is reacted in the absence of solvent, improved selectivity for cyclododecatriene, generally paralleling selectivity for cycloactadiene, was discovered.

It is particularly important to exclude solvents at certain temperatures. Prior investigators have considered that the presence of a solvent for the catalyst, reaction products, and/or conjugated diolefin is essential at temperatures then considered operable (preferably below 130° C., possibly up to 150° C.). It has now been found that a solvent is not required, and may be detrimental in certain circumstances. Thus, at certain temperatures below about 160° C. the presence of a solvent under the conditions of the present invention may almost completely inhibit the polymerization of butadiene, whether to cyclooctadiene, a desired product of the present invention, or to vinylcyclohexene. Heretofore, a solvent being used, it has been considered that at temperatures between about 130° C. and 150° C., excessive conversion of butadiene to vinylcyclohexeine occurred, but the effect of solvent was not noted. It is an important aspect of this invention that the reaction may be conducted above about 150° C., and when the conditions of the invention are followed, a high proportion of the butadiene or other diolefin is converted to the desired cyclic polyolefin, and undesired by-products such as vinylcyclohexene are maintained at a minimum.

On the other hand where conditions are properly chosen, a solvent may be used, although it is generally not preferred. Anomaly exists with regard to the use of an extraneous solvent. At certain temperatures (about 150 C., for example) the use of a solvent, as the amount of solvent increases, lowers both the proportion of diolefin such as butadiene converted to other materials and the yield or selectivity in regard to the production of cycloolefin such as cyclooctadiene. According to this invention, at temperatures somewhat above 150° C. the presence of a solvent becomes less detrimental as the temperature increases. Higher pressures also minimize such detrimental effects. Thus for dimerization of butadiene to cyclooctadiene, at and above temperatures in the neighborhood of 160° C. and a pressure of about 600 p.s.i.g., the inhibiting effect of solvent is diminshed, and at still higher temperatures and/or pressures, such as for example 205° C. and 1000 p.s.i.g., the deleterious effect of solvent such as benzene becomes less noticeable. Thus, while it is important to exclude added solvents at temperatures higher than about 150° C., the absence of solvent ceases to be essential at still higher temperatures, this being particularly true at temperatures in the range between about 160° C. and 250° C., and at higher pressures.

Wher a solvent is utilized according to the invention, those known in the art are suitable. Thus benzene, petroleum ethers, petroleum naphtha, tetrahydrofuran, toluene, p-cymene, 1,5-cyclooctadiene, and dicyclopentadiene, alone or in admixture, are useful. Other similar materials, for example, other hydrocarbon solvents, may be used. The vapor pressure of the selected solvent may influence the selection of useful conditions, such as maximum temperature.

The time of reaction is a function of the temperature. In batch reactions time may vary from less than one hour, for example .16, to several hours. In a continuous reaction using a stainless steel tube, for example, immersed in an oil bath, the portion immersed being the reaction zone, and in which the reaction zone has a volume of 80 ml., the feed rate may vary from a few ml. per hour, preferably at least about 20 ml. per hour, to in the neighborhood of 240 ml. per hour, and even up to 1000 ml. per hour or higher. At a given feed rate, of course, the reaction time will vary depending upon temperature. Where feed rates are specified, the feed material is liquid at the point of introduction into the reaction zone.

It is not essential, as believed by prior investigators, to utilize carefully cleaned glass-lined reaction vessels, but it has been discovered that carbon steel or stainless steel reaction vessels, for example, are practicable in this invention.

Ordinary precautions to exclude moisture are satisfactory in practicing this invention. Thus, in conducting batch reactions, in which the diolefin such as butadiene is ordinarily fed into the reaction vessel in liquid form at relatively low pressure, it is necessary to use very cold reaction vessels. In cooling such containers, it was found that a heavy coating of frost formed upon the interior thereof, and merely removing this coating of frost by wiping was found to be adequate in minimizing the amount of moisture present. It may be beneficial to pretreat materials present in the reaction mixture, such as butadiene or organic solvent, if used, with a dehydrating agent, or to incorporate such a dehydrating agent in the reaction mixture. Suitable for this are calcium oxide, calcium carbide, calcium sulphate, and less desirably, ethylene oxide. Solid dehydrating agents are preferably powdered.

The produtcs of reaction have utility as chemical intermediates. Thus, cyclooctadiene is useful in the preparation of cyclooctatetraene, cyclooctane, and cyclooctene, as well as in the preparation of polymers. Cyclododecatriene may be hydrogenated to products such as cyclododecene and cyclododecane. Even "by-products" such as vinylcyclohexene may be recovered and utilized, for example, to prepare synthetic resins.

It is to be understood that the specific isomers mentioned above or as understood in the art are the ones intended wherever the general name of a group of isomers is used for convenience. Thus, wherever "butadiene" is mentioned, 1,3-butadiene is the isomer referred to, and "cyclopentadiene" is 1,3-cyclopentadiene. Similarly, the cis-cis isomer of 1,5-cyclooctadiene is the geometrical isomer of this invention, and "diolefin" means an open chain conjugated diolefin.

The word "catalyst" is used herein, although the phrase "reaction initiator" may have greater accuracy in some instances, and the phrase "catalyst activators" is used to denote the herein described "activator" compounds even though the exact functions of the compounds have not been completely ascertained. Unless otherwise stated, the catalyst is bis(triphenylphosphite) nickel dicarbonyl, and solvent, where used, is benzene.

Some of the values and abbreviations used herein as applied to butadiene for example, are as follows:

$$\text{Conversion} = \frac{\text{wt. butadiene consumed}}{\text{wt. total butadiene fed}} \times 100$$

$$\text{Selectivity} = \frac{\text{wt. single product}}{\text{wt. butadiene consumed}} \times 100$$

$$\text{Yield}\left(\frac{\text{selectivity} \times \text{conversion}}{100}\right)$$

$$= \frac{\text{wt. single product}}{\text{wt. total butadiene fed}} \times 100$$

VCH is vinylcyclohexene; COD is cyclooctadiene; X–12 is 1,5,9-cyclododecatriene; in some cases "X–12" includes lesser amounts of volatile unknowns. Unreacted diolefin is advantageously recycled, although the values for conversion, selectivity, and yield given herein are for a single "pass" without recycling butadiene. ND represents "non-distillables."

The following examples are given by way of illustration, not by way of limitation.

BATCH PROCESSES

EXAMPLE 1

A number of runs were made using small reaction bombs, which were charged with 10 g. of butadiene and 0.25 g. of bis(triphenylphosphite) nickel dicarbonyl. The empirical formula for this catalyst is $$[(C_6H_5O)_3P]_2Ni(CO)_2$$

In this and following examples, the materials in the reaction zone consist of diolefin and catalyst, unless the contrary is indicated. The results of the runs are as follows:

| Temperature,° C. | Time, Hours | Conversion | Selectivity COD |
|---|---|---|---|
| 96 | [1] 19.5 | 70 | 71 |
| 170 | [1] 4 | 60 | 63.4 |
| 170 | 0.25 | 71.5 | 63 |
| 170 | 1 | 85.5 | 64 |
| 96 | 4.5 | 66.5 | 64 |
| [2] 125 | 1 5 | 88.5 | 68.9 |
| [2][3] 125 | 1 5 | 100 | 79.7 |
| 170 | 0.16 | 44.0 | 57.3 |
| 145 | 4.50 | 95.0 | 59.3 |
| 120 | 3.50 | 90.0 | 65.9 |
| 120 | 19.50 | 99.0 | 74.8 |

[1] The temperature was gradually brought up to the reaction temperature, requiring a time of one to two hours which is not included in the time figures for these runs. In remaining runs, the bomb was directly immersed in a bath at the specified reaction temperature and the time indicated is measured from the time heating was commenced.
[2] 0.5 g. of powdered calcium carbide was added as a dehydrating agent.
[3] A polymerization inhibitor, 0.04 g. of p-tertiary-butylcatechol was utilized.

In some cases, the exothermic nature of the reaction caused the temperatures of the bomb contents to rise above given figures for short periods.

The ratio of vinylcyclohexene to cyclooctadiene varied between approximately 3 to 5 and 1 to 7. Small amounts of other volatile products including unknowns, as well as small amounts of non-distillable products including polymer, were obtained.

When isoprene or chloroprene is used in place of butadiene, similar results are obtained. Bis(trimethylphosphite) nickel dicarbonyl is also a suitable catalyst.

CONTINUOUS PROCESS

The drawings

Figure 1:
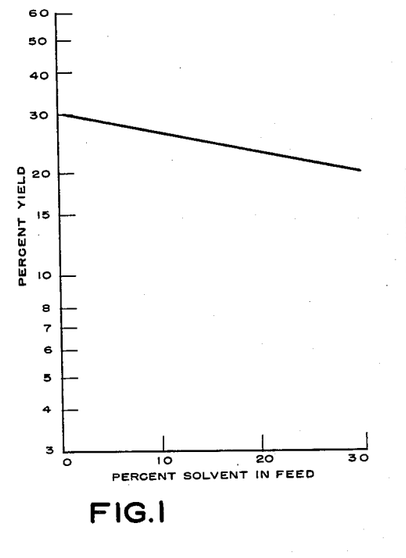
FIGURES 1–5 illustrate the effects, upon yield, of benzene solvent concentration in a continuous process.
Figure 2:
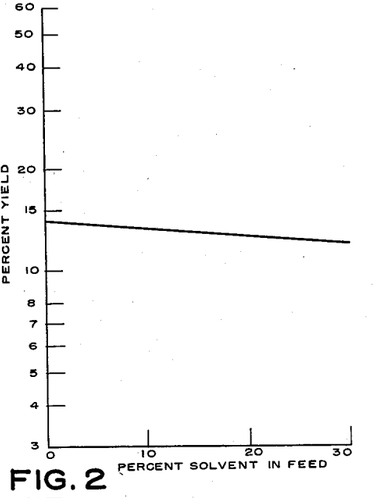
Figure 3:
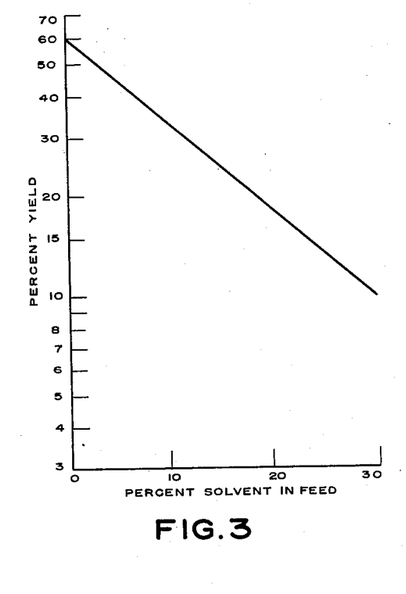
Figure 4:
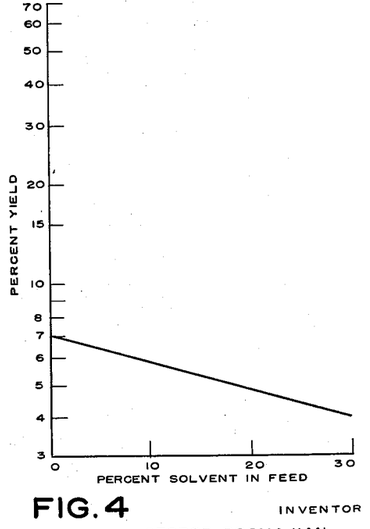
Figure 5:
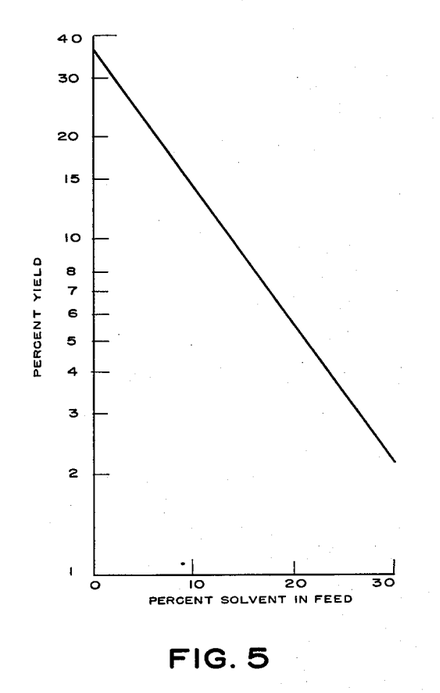

FIGURES 1–5 are based on the runs set forth in Table I which were selected from the data of the examples below. The table and graphs are self-explanatory, indicating primarily the effect of solvent at various temperatures, pressures, and feed rates.

*Table 1.—Effect of benzene as a solvent on yield of cyclooctadiene using 3% by weight of catalyst in the feed liquid*

| Percent solvent in feed | Percent yield | Pressure, p.s.i.g. | Temp., °C. | Feed¹ rate r./r./hr. | Run No. | Fig. No. |
|---|---|---|---|---|---|---|
| 0 | 30 | 1,000 | 150 | 1.3 | 10(e) | 1 |
| 30 | 20 | 1,000 | 150 | 1.3 | 10(i) | 1 |
| 0 | 7 | 1,000 | 165 | 4 | 6(c) | 4 |
| 30 | 4 | 1,000 | 165 | 4 | 6(h) | 4 |
| 0 | 34 | 600 | 165 | 4 | 6(a) | 5 |
| 15 | 10 | 600 | 165 | 4 | 9(a) | 5 |
| 30 | 2 | 600 | 165 | 4 | 6(g) | 5 |
| 0 | 59 | 600 | 165 | 1 | 8(a) | 3 |
| 30 | 10 | 660 | 165 | 1 | 8(c) | 3 |
| 0 | 14 | 600 | 205 | 4 | 7(b) | 2 |
| 30 | 12 | 600 | 205 | 4 | 7(a) | 2 |

¹ Feed rate is expressed in terms of volumes of liquid feed per volume of reactor per hour.

EXAMPLE 2

The "continuous reactor" apparatus consisted of a feed reservoir, in which the desired pressure was maintained by an inert gas, and a reactor in the form of a coiled tube, for instance of stainless steel, was immersed in a heated oil bath. Feed liquid passed from the reservoir through the hot coil tube. The volume of the immersed portion of the tube in the heated zone was 80 ml. At short intervals of time, or continuously, measured amounts of liquid products were withdrawn through an exit needle valve. In this manner the feed rate is easily controlled.

The reactions above about 152° C. are referred to as vapor or gas phase since that is the critical temperature of butadiene, as discussed above. In the "liquid phase" reactions (below about 152° C.), residence time is calculated from feed rate. A limitation of the apparatus is that the residence time of the reactants in the vapor or gas phase reaction is not precisely known. For the same feed rate, reactor residence time was less when using vapor phase conditions than when using liquid phase conditions, according to the methods used in these runs. It is possible to measure feed rate, pressure, and temperature so a precise knowledge of residence time is desirable but not essential. Pressure is intimately concerned with residence time, one reason being that temperature and pressure will determine whether or not the reactants and products of reaction are liquid or are in the vapor form.

| Run No. | Feed rate ml./hr. | Temperature, °C. | Pressure p.s.i.g. | Conversion | Selectivity COD |
|---|---|---|---|---|---|
| 1(a) | 80 | 190– 81 | 1,000 | 71 | 51 |
| 1(b) | 92 | 128–140 | 990 | 52 | 27 |
| 2(a) | 90 | 178 | 970 | 82 | 54 |
| 2(b) | 68 | 180 | 550 | 78 | 24 |
| 3(a) | 80 | 175–185 | 500 | 92 | 69 |
| 3(b) | 80 | 180–185 | 1,000 | 98 | 65 |
| 4(a) | 240 | 160 | 600 | 76 | 68 |
| 4(b) | 240 | 160 | 960 | 76 | 65 |

(1) The feed reservoir was charged with a reaction mixture consisting of 670 g. of butadiene and 5 g. of catalyst [bis(triphenylphosphite) nickel dicarbonyl].

(2) These runs were made using materials in the feed reservoir consisting of 570 g. butadiene, 130 g. benzene, and 5 g. catalyst [bis(triphenylphosphite) nickel dicarbonyl]. Where a solvent such as benzene was used, the vinylcyclohexene to cyclooctadiene ratio seldom was lower than 1 to 3. It is postulated that the presence of a suitable solvent tends to prevent the deposition of solid polymer at certain temperatures.

(3) These were similar to the above but the feed reservoir was charged with 670 g. butadiene and 6.6 g. bis-(triphenylphosphite) nickel dicarbonyl.

In runs such as 1(a), where the catalyst was found not to be completely dissolved because of inadequate agitation, it appears that the reaction tended to follow a purely thermal reaction, which is considered to result in high proportions of vinylcyclohexene.

(4) Pressures in the neighborhood of 600 p.s.i.g. are advantageous, and higher pressures slightly decrease the efficiency of the reaction. In runs 4(a) and 4(b), 1.5% catalyst [bis(triphenylphosphite) nickel dicarbonyl] was utilized.

The following reactions were continued in the continuous reaction apparatus described above, after a minor refinement was made to minimize the possibility of non-distillable materials plugging the reaction tube.

EXAMPLE 3

The following "complex" mixture runs were made using a reaction mixture containing 22.2% benzene, 74.2% butadiene, 1.7% bicycloheptadiene catalyst activator, 0.1% p-tertiary-butylcatechol, 0.9% bis(triphenylphosphite) nickel dicarbonyl and 0.9% powdered calcium carbide, and compared with "simple" mixture runs. The mixture as stated in the preceding sentence is hereinafter called the "complex" mixture, and reactions which consist of contacting the catalyst and reaction materials consisting essentially of open chain diolefin are called "simple" mixtures. Data for runs using comparable proportions are as follows:

165° C., 60 ml. per hr., 600 p.s.i.g.

| Run No. | Type of Feed | Selectivity | | | Conversion |
|---|---|---|---|---|---|
| | | COD | VCH | ND | |
| 5(a) | Simple | 64 | 14 | 11 | 86 |
| 5(b) | Complex | 27 | 45 | 24 | 12 |

145° C., 80 ml. per hr., 1,000 p.s.i.g.

| Run No. | Type of Feed | Selectivity | | | Conversion |
|---|---|---|---|---|---|
| | | COD | VCH | ND | |
| 5(c) | Simple | 37 | 42 | 11 | 12 |
| 5(d) | Complex | 6 | 76 | 10 | 5 |

Of the preceding four runs, 5(a) approximately corresponds to the optimum conditions, and the conditions recited in runs 5(c) and 5(b) are not preferred. Run 5(d) is outside the scope of the present invention.

Unless otherwise stated, the concentration of materials such as catalyst and solvent, if present, are based on the weight of the reaction mixture.

DETERMINING OPTIMUM CONDITIONS FOR CONTINUOUS REACTION ABOVE AND BELOW CRITICAL TEMPERATURE OF BUTADIENE

Data appears hereinafter for the synthesis of cyclooctadiene in a continuous reactor, described above, to establish optimum conditions for the continuous process. Reactions have been divided into two groups: those above 152° C., which is the critical temperature of butadiene; and those below 152° C. Results were found to be reproducible within a few percentage points, in selectivities for cyclooctadiene and vinylcyclohexene.

EXAMPLE 4

A. *Continuous dimerization and trimerization of butadiene to cyclooctadiene and cyclododecatriene in the "vapor phase"*

1. EFFECT OF PRESSURE

When no solvent was used, the selectivity for cyclooctadiene increased as the pressure was decreased, and the increase was at the expense of vinylcyclohexene production. When solvent was used, the cyclooctadiene selectivity increased. The vinylcyclohexene selectivity increased slightly while the non-distillables decreased as the pressure increased. Of course, the above are generalizations, and a judicious selection of conditions must be made. For example, using a feed rate of .75 reactor volumes per hour and 165° C. at atmospheric pressure there was substantially no reaction, while at 200 p.s.i.g. the generalization as to selectivity being high is true, but the conversion of butadiene to reaction products was low. The runs or samples set forth are selected to show the effect of variations in conditions, and in most cases are averages of a number of samples taken in single continuous runs.

3% catalyst, no solvent

| | Sample No. | Conversion | Selectivity | | | ND | Yield COD |
|---|---|---|---|---|---|---|---|
| | | | VCH | COD | X-12 | | |
| 240 ml./hr., 165° C.: | | | | | | | |
| 600 p.s.i.g. | 6(a) | 50 | 18 | 67 | 5 | 7 | 34 |
| 800 p.s.i.g. | 6(b) | 13 | 28 | 53 | 2 | 16 | 6.9 |
| 1,000 p.s.i.g. | 6(c) | 13 | 35 | 54 | 3 | 7 | 7.0 |

0.75% catalyst, no solvent

| | Sample No. | Conversion | VCH | COD | X-12 | ND | Yield COD |
|---|---|---|---|---|---|---|---|
| 60 ml./hr., 165° C.: | | | | | | | |
| Atm. | 6(d) | 0 | | | | | 0 |
| 200 p.s.i.g. | 6(e) | 10 | 10 | 73 | 2 | 5 | 7 |
| 600 p.s.i.g. | 6(f) | 86 | 14 | 64 | 11 | 10 | 55 |

3% catalyst, 30% solvent

| | Sample No. | Conversion | VCH | COD | X-12 | ND | Yield COD |
|---|---|---|---|---|---|---|---|
| 240 ml./hr., 165° C.: | | | | | | | |
| 600 p.s.i.g. | 6(g) | 7 | 28 | 33 | 0 | 27 | 2 |
| 1,000 p.s.i.g. | 6(h) | 7 | 32 | 52 | Tr. | 13 | 4 |

2. EFFECT OF TEMPERATURE

The selectivity for cyclooctadiene tended to increase as the temperature decreased at the expense of non-distillables and vinylcyclohexene. X-12 appeared to follow the same pattern as cyclooctadiene. Conversions and selectivities for cyclooctadiene were near the maximum at about 165° C. as long as a pressure of about 600 p.s.i.g. and 3% catalyst were used. Solvent, when used, reverses the effect of temperature in that the selectivity for cyclooctadiene increased as the temperature increased.

3% catalyst, no solvent

| | Sample No. | Conversion | VCH | COD | X-12 | ND | Yield COD |
|---|---|---|---|---|---|---|---|
| 240 ml./hr., 600 p.s.i.g.: | | | | | | | |
| 165° C. | 6(a) | 50 | 18 | 67 | 5 | 7 | 34 |
| 185° C. | 7(a) | 25 | 20 | 57 | 2 | 20 | 14 |
| 205° C. | 7(b) | 52 | 25 | 56 | 0.3 | 18 | 29 |

3% catalyst, 30% solvent

| | Sample No. | Conversion | VCH | COD | X-12 | ND | Yield COD |
|---|---|---|---|---|---|---|---|
| 240 ml./hr., 600 p.s.i.g.: | | | | | | | |
| 165° C. | 6(g) | 7 | 28 | 33 | 0 | 27 | 2 |
| 205° C. | 7(c) | 45 | 26 | 56 | 0 | 15 | 25 |

3. EFFECT OF FEED RATE

A slight increase in cyclooctadiene selectivity occurred as the feed rate was increased although the conversion decreased. Where the selectivity for cyclooctadiene is high and the conversion is low, economical operation may be achieved by recycling unreacted butadiene, since more product may be obtained from the same size reactor. When benzene was used as solvent, the conversions were generally lower than in the absence of solvent, and also decreased as the feed rate was increased.

3% catalyst, no solvent

| | Sample No. | Conversion | VCH | COD | X-12 | ND | Yield COD |
|---|---|---|---|---|---|---|---|
| 165° C., 600 p.s.i.g.: | | | | | | | |
| 60 ml./hr. | 8(a) | 98 | 21 | 60 | 6 | 13 | 59 |
| 120 ml./hr. | 8(b) | 71 | 21 | 63 | 6 | 10 | 45 |
| 240 ml./hr. | 6(a) | 50 | 18 | 67 | 5 | 7 | 34 |

4. EFFECT OF CATALYST CONCENTRATION

The following data indicate that in the range of 0.75% to 3% by weight of catalyst, bis(triphenylphosphite) nickel dicarbonyl, there is little significant effect on cyclooctadiene selectivity. There is some indication that the selectivity for vinylcyclohexene and non-distillables tended to increase with an increase in catalyst concentration, and the selectivity for minor volatile materials decreased as catalyst concentration was increased.

600 p.s.i.g., no solvent

| | Sample No. | Conversion | VCH | COD | X-12 | ND | Yield COD |
|---|---|---|---|---|---|---|---|
| 60 ml./hr., 165° C., catalyst: | | | | | | | |
| 0.75% | 6(f) | 86 | 14 | 64 | 11 | 10 | 55 |
| 3.0% | 8(a) | 98 | 21 | 60 | 6 | 13 | 59 |

5. EFFECT OF SOLVENT

Since prior investigators have believed that benzene was perhaps the best solvent to be used in reactions wherein butadiene is dimerized to cyclooctadiene, the effect of benzene as a solvent was studied, as shown in the table which appears below. The presence of solvent increased the selectivities for vinylcyclohexene and the non-distillables. To achieve improved selectivities for cyclooctadiene and cyclododecatriene, solvent is omitted. The overall data show that the elimination of solvent causes the selectivities for these two products to be approximately parallel. With solvent, conversions were generally reduced, but at the higher temperatures and pressures the effect was not as great. The data here and in Examples 2 and 5 show that certain conditions in effect preclude the use of solvent.

3% catalyst, 600 p.s.i.g.

| | Sample No. | Conversion | VCH | COD | X-12 | ND | Yield COD |
|---|---|---|---|---|---|---|---|
| 240 ml./hr., 165° C., solvent: | | | | | | | |
| 0% | 6(a) | 50 | 18 | 67 | 5 | 7 | 34 |
| 15% | 9(a) | 17 | 23 | 58 | 3 | 15 | 10 |
| 30% | 6(g) | 7 | 28 | 33 | 0 | 27 | 2 |
| 240 ml./hr., 205° C., solvent: | | | | | | | |
| 0% | 7(b) | 52 | 25 | 56 | 1 | 18 | 29 |
| 30% | 7(c) | 45 | 26 | 56 | 0 | 15 | 25 |

3% catalyst, 1,000 p.s.i.g.

| | Sample No. | Conversion | VCH | COD | X-12 | ND | Yield COD |
|---|---|---|---|---|---|---|---|
| 240 ml./hr., 165° C., solvent: | | | | | | | |
| 0% | 6(c) | 13 | 35 | 54 | 3 | 7 | 7 |
| 30% | 6(h) | 7 | 32 | 52 | Tr. | 13 | 4 |

6. CONCLUSIONS; "VAPOR PHASE"

Recapitulating the effects of the various conditions within the range of study above the vapor phase temperature of 152° C., the conversions would probably be best at about 500–700 p.s.i.g. and the selectivity for cyclooctadiene would probably be best at about 200–400 p.s.i.g. The maximum yield of cyclooctadiene is obtained between 400 and 600 p.s.i.g. Thus, about 400–600 p.s.i.g. is the preferred operating pressure range.

The best butadiene conversion would be obtained at the higher temperatures; however, higher temperatures decrease the cyclooctadiene selectivity and increase the formation of vinylcyclohexene. The best temperature range is about 165° C. to 180° C.

The best cyclooctadiene selectivities were obtained at the high feed rates, but the conversions were less. A satisfactory balance between the two depends upon the cost of recycling the unreacted butadiene. Because of the greater rate of production of cyclooctadiene from a given size reactor using a high feed rate, it would appear that an optimum feed rate would be in the range of 120 to 240 ml./hr. or 1.5 to 3 volumes of liquid feed per volume of reactor per hour.

The catalyst concentration did not appear to affect the selectivity for cyclooctadiene greatly; however, as the catalyst concentration was increased, the selectivities for vinylcyclohexene and non-distillables increased. The catalyst concentration should be around 1.5%.

Solvents are ordinarily detrimental to some extent and, accordingly, are not preferred constituents of the reaction mixture according to the present invention. However, in the event solvents are used, essential conditions are more severe than in the absence of solvent.

EXAMPLE 5

B. *Continuous dimerization and trimerization of butadiene to cyclooctadiene and cyclododecatriene in the liquid phase*

The pressure was held constant at 1000 p.s.i.g. for the runs below the critical temperature of butadiene (152° C.) to make sure the reactions were carried out in the liquid phase. The variables studied were temperature, feed rate, catalyst concentration, and the presence or absence of solvent and its concentration.

1. EFFECT OF TEMPERATURE

Inordinately long residence time (low feed rate of reactant liquid) was required to obtain appreciable conversion of butadiene to products of reaction at temperatures of 125° C. and below in the continuous reactor. At 150° C., the conversion increased sharply. The selectivities for cyclooctadiene and cyclododecatriene increased as the reaction temperature increased, and decreased for vinylcyclohexene and non-distillables.

3% catalyst, no solvent

| | Sample No. | Conversion | Selectivity | | | ND | Yield COD |
|---|---|---|---|---|---|---|---|
| | | | VCH | COD | X-12 | | |
| 20 ml./hr.: | | | | | | | |
| 125° C | 10(a) | 15 | 28 | 51 | 1 | 19 | 8 |
| 150° C | 10(b) | 78 | 21 | 58 | 3 | 16 | 45 |
| 80 ml./hr.: | | | | | | | |
| 125° C | 10(c) | Tr. | (1) | (1) | (1) | (1) | (1) |
| 135° C | 10(d) | 4 | 25 | 57 | 2 | 11 | 2 |
| 150° C | 10(e) | 54 | 22 | 56 | 4 | 15 | 30 |

0.75% catalyst, no solvent

| | Sample No. | Conversion | Selectivity | | | ND | Yield COD |
|---|---|---|---|---|---|---|---|
| | | | VCH | COD | X-12 | | |
| 80 ml./hr.: | | | | | | | |
| 125° C | 10(f) | Tr. | (1) | (1) | (1) | (1) | (1) |
| 150° C | 10(g) | 12 | 20 | 33 | 2 | 34 | 4 |

3% catalyst, 30% solvent

| | Sample No. | Conversion | Selectivity | | | ND | Yield COD |
|---|---|---|---|---|---|---|---|
| | | | VCH | COD | X-12 | | |
| 80 ml./hr.: | | | | | | | |
| 125° C | 10(h) | 8 | 29 | 16 | | 50 | 1 |
| 150° C | 10(i) | 43 | 27 | 47 | 0.8 | 22 | 20 |

[1] Not enough sample for analysis.

2. EFFECT OF FEED RATE

At temperatures lower than about 150° C., increases in feed rate caused decreases in conversion and in selectivity for cyclooctadiene and cyclododecatriene (sometimes called "oligomers" of butadiene), as well as increases in selectivities for vinylcyclohexene and non-distillables. The effect is more marked at lower temperatures such as 125° C. The conclusion drawn from these data is that substantially lengthened reaction times (lower feed rates) are required as the temperature utilized is decreased below the critical temperature of butadiene. The increase in the selectivity for non-distillables obtained is especially marked in the presence of solvent at higher feed rates.

3% catalyst, no solvent

| | Sample No. | Conversion | Selectivity | | | ND | Yield COD |
|---|---|---|---|---|---|---|---|
| | | | VCH | COD | X-12 | | |
| 125° C.: | | | | | | | |
| 20 ml./hr | 10(a) | 15 | 28 | 51 | 1 | 19 | 8 |
| 40 ml./hr | 11(a) | 17 | 42 | 40 | 7 | 9 | 7 |
| 80 ml./hr | 10(c) | Tr. | | | | | |
| 50° C.: | | | | | | | |
| 20 ml./hr | 10(b) | 78 | 21 | 58 | 3 | 16 | 45 |
| 40 ml./hr | 11(b) | 68 | 19 | 63 | 7 | 9 | 43 |
| 80 ml./hr | 10(e) | 54 | 22 | 56 | 4 | 15 | 30 |

3% catalyst, 30% solvent

| | Sample No. | Conversion | Selectivity | | | ND | Yield COD |
|---|---|---|---|---|---|---|---|
| | | | VCH | COD | X-12 | | |
| 125° C.: | | | | | | | |
| 20 ml./hr | 11(c) | 62 | 21 | 63 | 2 | 14 | 39 |
| 80 ml./hr | 10(h) | 8 | 29 | 16 | | 50 | 1 |

3. EFFECT OF CATALYST CONCENTRATION

As the catalyst concentration was increased, both the selectivity for cyclooctadiene and conversion were increased. When benzene was used as the solvent, the cyclooctadiene yield did not change appreciably with varied catalyst concentrations; however, the yield of vinylcyclohexene decreased and the yield of non-distillables increased as the catalyst concentration increased.

150° C., no solvent

| | Sample No. | Conversion | Selectivity | | | ND | Yield COD |
|---|---|---|---|---|---|---|---|
| | | | VCH | COD | X-12 | | |
| 80 ml./hr., catalyst: | | | | | | | |
| 0.75% | 10(g) | 12 | 20 | 33 | 2 | 34 | 4 |
| 3.0% | 10(e) | 54 | 22 | 56 | 4 | 15 | 30 |

125° C., 30% solvent

| | Sample No. | Conversion | Selectivity | | | ND | Yield COD |
|---|---|---|---|---|---|---|---|
| | | | VCH | COD | X-12 | | |
| 80 ml./hr., catalyst: | | | | | | | |
| 1.0% | 12(a) | 2 | 50 | 18 | | 28 | 0.4 |
| 3.0% | 10(h) | 8 | 29 | 16 | | 50 | 1 |

4. EFFECT OF SOLVENT

Selectivity for non-distillables increased as the amount of benzene solvent in the reaction mixture was increased. The selectivity for cyclododecatriene generally parallels that for cyclooctadiene in the absence of solvent. At the higher feed rates, the cyclooctadiene selectivity was lowered when solvent was used.

An anomoly appears in the data in connection with the use of a solvent. At lower temperatures in the neighborhood of 125° C. the presence of a solvent appears to increase conversions of butadiene to products. This apparently confirms the results of Reed, as described in the references noted above. Also the data of Reed may be interpreted as showing that when the temperature is above about 130° C. and as it approaches 150° C. the presence of a solvent is markedly detrimental, particularly in light of the present invention. However, as the temperatures are further increased to temperatures well above 150° C., and with higher pressures, as shown in the data of Example 9, the detrimental effect of solvent diminishes as the conditions become more severe. Prior investigators indicated that the presence of a solvent was essential, perhaps because the prior experiments were conducted at temperatures preferably below 130° C. The use of a solvent at temperatures below about 150° C. is accordingly not a part of the present invention, but the data are presented for purposes of comparison.

3% catalyst, 125° C.

| | Sample No. | Conversion | Selectivity | | | ND | Yield COD |
|---|---|---|---|---|---|---|---|
| | | | VCH | COD | X-12 | | |
| 20 ml./hr.: | | | | | | | |
| 0% solvent | 10(a) | 15 | 28 | 51 | 1 | 19 | 8 |
| 30% solvent | 11(c) | 62 | 21 | 63 | 2 | 14 | 39 |
| 80 ml./hr.: | | | | | | | |
| 0% solvent | 10(c) | Tr. | | | | | |
| 15% solvent | 13(a) | 4 | 25 | 38 | | 33 | 2 |
| 30% solvent | 10(h) | 8 | 29 | 16 | | 50 | 1 |

3% catalyst, 150° C.

| | Sample No. | Conversion | Selectivity | | | ND | Yield COD |
|---|---|---|---|---|---|---|---|
| | | | VCH | COD | X-12 | | |
| 80 ml./hr.: | | | | | | | |
| 0% solvent | 10(e) | 54 | 22 | 56 | 4 | 15 | 30 |
| 30% solvent | 10(i) | 43 | 27 | 47 | 0.8 | 22 | 20 |

Although the use of a solvent in addition to open chain conjugated diolefin at the higher temperature is a part of this invention, it is preferred to conduct the method in the absence of such added solvent, some reasons being that when added material such as benzene is present, the results are not as good, the reactions often showed extreme changes, and at times the results were opposite those obtained when no solvent was used. Because of such erratic behavior the use of a solvent in addition to the conjugated open chain diolefin is preferably avoided.

After examining the results obtained from the dimerization reactions of butadiene conducted both above and below the critical temperatures, it appears that a set of optimum conditions can be chosen to give good cyclooctadiene and fair cyclododecatriene yields at a good conversion. These conditions should be:

Pressure _________________ 400–600 p.s.i.g.
Temperature _____________ 150–170° C.
Feed rate _________________ 0.8–3 volumes liquid feed per volume of reactor per hour.
Catalyst concentration _____ 1–1.5% by weight.
Solvent concentration ______ None.

The lower feed rate would give about 90% conversion and 62% selectivity for cyclooctadiene, and the higher feed rate about 63% conversion and 68% cyclooctadiene selectivity.

The optimum conditions may vary under certain circumstances. Thus, where conversions are low and selectivity for cycloolefin is high, and it is not too expensive to recycle diolefin, it may be preferred to operate under lower conversions in preference to operating under conditions which would give higher conversions but lower selectivity for cycloolefin. Similarly, in the event a solvent is used, "optimum" conditions will vary accordingly.

In the event reactions are carried out substantially below the critical temperature of the diolefin, it is preferred to use higher pressures to assure liquid conditions, for example, 1000 p.s.i.g., and to use lower feed rates, for example from about .1 to about .4 volume of liquid feed per volume of reactor per hour. At such lower temperatures as the temperature approaches 150° C., and even up to about 160° C., it is necessary to operate in the absence of solvent because of extreme changes in selectivity and conversion.

DETERMINATION OF THE HEAT OF REACTION

In order to determine the heat of reaction of the dimerization of butadiene, some heats of combustion were measured for the calculation. The values for the liquids at 25° C. were:

| Liquid: | B.t.u. per lb. |
|---|---|
| Vinylcyclohexene (1) | 18,220 |
| Vinylcyclohexene (2) | 18,316 |
| Cyclooctadiene | 19,111 |
| Other volatile products | 18,590 |
| Residue | 17,521 |

The above heats of combustion were measured using a conventional method for determining the heat of combustion of coal.

Averaging a number of continuous satisfactory runs, the products from 100 lbs. of converted butadiene were 15 lbs. of vinylcyclohexene, 69 lbs. of cyclooctadiene, 8 lbs. of other volatile products, and 8 lbs. of residue. Using 19,899 B.t.u. per lb. as the heat of combustion of butadiene at 25° C. and one atmosphere, it was determined that the heat of reaction is −1083 B.t.u. per lb. or −32.6 kcal. per mol of butadiene reacting at 25° C. and one atmosphere. The negative heat of reaction means the reaction is exothermic. It is assumed that in the reaction the butadiene is a gas and the products are liquid. At a reaction temperature of 180° C. and a pressure of 30 atmospheres, the heat of reaction (ignoring any effect due to raising the pressure) was calculated to be −30.3 kcal. per mol of butadiene reacting or −1008 B.t.u. per lb. The uncertainty of this value is believed to be less than 5 kcal. per mol or 170 B.t.u. per lb.

PREPARATION OF CATALYSTS

The catalysts are prepared by well known methods. For example, nickel carbonyl is reacted with triphenylphosphite in ether, of course taking proper precautions to avoid nickel carbonyl poisoning of personnel. The product in this case, bis(triphenylphosphite) nickel dicarbonyl need not be reprecipitated or recrystallized, but may be used after drying as obtained from the reaction mixture. Other catalysts useful herein may be prepared by appropriate methods.

The nature of the active material from bis(triphenylphosphite) nickel carbonyl "catalyst" is not completely known. In an attempt to determine the nature of the material a small amount was heated for two hours at 170° C. in a bomb which had been loaded in air at atmospheric pressure and room temperature. The catalyst, which was blackened by this treatment, was later used and was found to produce yields of cycloolefin which were not greatly lower than those obtained with the catalyst which had not been preheated. This indicates that recovered catalyst may be reused.

ANALYSIS OF REACTION PRODUCTS

The vaporizable reaction products were analyzed by means of gas chromatography. Standardization was accomplished by analyzing known mixtures of materials present in the reaction product.

In analyzing the products the distillations were considered complete when no more distillate could be obtained at a temperature of 170–180° C. and 3 mm. pressure. The residue from the distillation was reported as non-distillable polymer or residue.

The diolefin appears to be directly dimerized to cycloolefin when appropriate catalysts are used, with no intermediate products of reaction. In support of this conclusion, it was attempted to conduct the reaction using vinylcyclohexene as the starting material, having in mind the possibility that vinylcyclohexene could be an intermediate in the reaction in which cyclooctadiene is obtained from butadiene. The catalyst was bis(triphenylphosphite) nickel dicarbonyl, and the reaction conditions used were those in which butadiene dimerizes successfully to cyclooctadiene. No cyclooctadiene was obtained, and the only apparent reaction was polymerization, since approximately 3% of non-distillable material was obtained.

The invention of this application is related to the copending applications of Sekul and Sellers, Serial No. 808,578, filed April 2, 1959, now Patent No. 2,964,575; Sellers and Sekul, Serial No. 801,730, filed March 25, 1959, now Patent No. 2,991,317; and Burks and Sekul, Serial No. 808,930, filed April 27, 1959, now Patent No. 2,972,640.

We claim:

1. In a process for the production of cycloolefinic compounds containing at least 8 carbon atoms in the ring by contacting an open chain conjugated diolefin with a catalyst selected from the group consisting of compounds having the empirical formulas $$[(R)_3P]_xNi(CO)_{4-x}$$

and $[(RO)_3P]_xNi(CO)_{4-x}$, in which R is an organic radical and $x$ is one or two, which catalyst selectively reacts said diolefin to said cycloolefinic compounds, comprising the step of subjecting said open chain conjugated diolefin, in the presence of said catalyst, to conditions of elevated temperature and a pressure greater than atmospheric pressure, the improvement in which said temperature is kept between about 140° C. and 205° C., controlling said process so that said selective reaction takes place, and in which said reaction is conducted in the absence of extraneous solvent.

2. The process of claim 1 in which said diolefin is butadiene.

3. The process of claim 1 in which said diolefin is isoprene.

4. The process of claim 1 in which said diolefin is chloroprene.

5. The process of claim 1 in which R is phenyl.

6. In a process for the production of cycloolefinic compounds containing at least 8 carbon atoms in the ring by contacting an open chain conjugated diolefin with a catalyst selected from the group consisting of compounds having the empirical formulas $$[(R)_3P]_xNi(CO)_{4-x}$$

and $[(RO)_3P]_xNi(CO)_{4-x}$, in which R is an organic and $x$ is one or two, which catalyst selectively reacts said diolefin to said cycloolefinic compounds, comprising the step of subjecting said open chain conjugated diolefin to conditions of elevated temperature and to a pressure above atmospheric pressure in the presence of said catalyst, the improvement in which said temperature is kept above about 150° and below about 205°.

7. In a process for the production of cycloolefinic compounds containing at least 8 carbot atoms in the ring by contacting an open chain conjugated diolefin with a catalyst selected from the group consisting of compounds having the empirical formulas $[(R)_3P]_xNi(CO)_{4-x}$ and $[(RO)_3P]_xNi(CO)_{4-x}$, in which R is an organic radical and $x$ is one or two, which catalyst selectively reacts said diolefin to said cycloolefinic compounds, comprising the step of subjecting said open chain conjugated diolefin to conditions of elevated temperature and to a pressure above atmospheric pressure in the presence of said catalyst, the improvement in which said temperature is kept between about 145° C. and 205° C., and in which the fluid material in contact with said catalyst consists essentially of said conjugated diolefin and the reaction products.

8. The process of claim 7 in which the diolefin is butadiene, and the cycloolefinic products include cyclooctadiene and cyclododecatriene.

9. In a process for the production of cycloolefinic compounds containing at least 8 carbon atoms in the ring by contacting an open chain conjugated diolefin with a catalyst selected from the group consisting of compounds having the empirical formulas $[(R)_3P]_xNi(CO)_{4-x}$ and $[(RO)_3P]_xNi(CO)_{4-x}$, in which R is an organic radical and $x$ is one or two, which catalyst selectively reacts said diolefin to said cycloolefinic compounds, comprising the step of subjecting said open chain conjugated diolefin to conditions of elevated temperature and to a pressure above atmospheric pressure, the improvement in which said temperature is kept between about 145° C. and 205° C., controlling said process so that said selective reaction takes place, and in which the fluid material introduced into the reaction zone and which is placed in contact with said catalyst consists of said conjugated diolefin.

10. In a process for the production of 1,5-cyclooctadiene and 1,5,9-cyclododecatriene by contacting butadiene with bis(triphenylphosphite) nickel dicarbonyl catalyst, at a pressure greater than atmospheric pressure, the improvement comprising conducting said process at temperatures between about 145° C. and 205° C., and conducting said reaction in the absence of extraneous solvent.

11. The process of claim 10 in which the temperature is between about 150° C. and 170° C.

12. In a continuous process of dimerizing butadiene to cyclooctadiene, the improvement including the steps of introducing reaction ingredients consisting essentially of butadiene and a catalyst comprising bis(triphenylphosphite) nickel dicarbonyl into a continuous reactor, conducting the reaction at a pressure of between about 200 and 600 p.s.i.g., at a temperature of between about 150 and 170° C. at a feed rate corresponding to about 0.2 to 4 volumes of liquid feed per volume of reactor per hour, utilizing the catalyst at a concentration of between 0.5 and 4% by weight, and withdrawing reaction products from said reactor.

References Cited in the file of this patent
UNITED STATES PATENTS

| | | |
|---|---|---|
| 2,504,016 | Foster | Apr. 11, 1950 |
| 2,631,173 | Hillyer et al. | Mar. 10, 1953 |
| 2,686,209 | Reed | Aug. 10, 1954 |

UNITED STATES PATENT OFFICE
CERTIFICATION OF CORRECTION

Patent No. 3,004,081　　　　　　　　　　　　　　　　　October 10, 1961

George Bosmajian

It is hereby certified that error appears in the above numbered patent requiring correction and that the said Letters Patent should read as corrected below.

Column 1, line 45, for "butadient" read -- butadiene --; line 50, for "proces" read -- process --; same column 1, line 62, for "poinsons" read -- poisons --; column 2, line 23, for "1,3-pentadient" read -- 1,3-pentadiene --; line 24, for "phenyldiolefines" read -- phenyldiolefins --; same column 2, line 42, for "nicket" read -- nickel --; column 5, line 15, for "diminshed" read -- diminished --; line 24, for "Wher" read -- Where --; line 35, after ".16" insert -- hour --; same column 5, line 66, for "produtcs" read -- products --; column 12, in the first table, column 1, line 5, thereof, for "50° C." read -- 150° C. --; column 15, line 43, after "organic" insert -- radical --; line 50, for "205° ." read -- 205° C. --.

Signed and sealed this 17th day of April 1962.

(SEAL)
Attest:

ESTON G. JOHNSON
Attesting Officer

DAVID L. LADD
Commissioner of Patents